(12) United States Patent
Butterworth et al.

(10) Patent No.: US 8,321,543 B2
(45) Date of Patent: Nov. 27, 2012

(54) SYSTEM AND METHOD FOR DETERMINING WEAK MEMBERSHIP IN SET OF COMPUTER NODES

(75) Inventors: Henry Esmond Butterworth, East-leigh (GB); Joseph Samuel Glider, Palo Alto, CA (US); Juan Carlos Gomez, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2450 days.

(21) Appl. No.: 10/090,404

(22) Filed: Mar. 4, 2002

(65) Prior Publication Data

US 2003/0167322 A1 Sep. 4, 2003

(51) Int. Cl.
*G06F 15/173* (2006.01)
*G06F 11/00* (2006.01)

(52) U.S. Cl. .................... 709/223; 370/222; 709/242

(58) Field of Classification Search .............. 709/223, 709/228; 706/25, 45; 716/4, 6; 370/235; 703/0.13

See application file for complete search history.

(56) References Cited

U.S. PATENT DOCUMENTS

| | | | | |
|---|---|---|---|---|
| 5,303,328 A * | 4/1994 | Masui et al. | | 706/25 |
| 5,757,653 A * | 5/1998 | Christian et al. | | 716/4 |
| 5,999,712 A * | 12/1999 | Moiin et al. | | 709/220 |
| 6,016,306 A * | 1/2000 | Le Boudec et al. | | 370/235 |
| 6,074,429 A * | 6/2000 | Pullela et al. | | 716/6 |
| 6,154,735 A * | 11/2000 | Crone | | 706/45 |
| 6,192,401 B1 * | 2/2001 | Modiri et al. | | 709/220 |
| 6,192,483 B1 * | 2/2001 | Moiin et al. | | 714/4 |
| 6,360,259 B1 * | 3/2002 | Bradley | | 709/223 |
| 6,449,641 B1 * | 9/2002 | Moiin et al. | | 709/220 |
| 6,823,395 B1 * | 11/2004 | Adolfsson | | 709/242 |
| 6,963,747 B1 * | 11/2005 | Elliott | | 455/450 |
| 7,075,892 B2 * | 7/2006 | Grover et al. | | 370/238 |
| 7,139,925 B2 * | 11/2006 | Dinker et al. | | 714/4 |
| 2002/0187770 A1 * | 12/2002 | Grover et al. | | 455/403 |
| 2002/0196975 A1 * | 12/2002 | Cahill | | 382/171 |
| 2003/0069981 A1 * | 4/2003 | Trovato | | 709/228 |

OTHER PUBLICATIONS

Lee et al., Synchronous and asynchronous parallel simulated annealing with multiple Markov Chains, Parallel and Distributed systems. IEEE Transactions on vol. 7, issue 10, Oct. 1996, pp. 993-1008.*

* cited by examiner

*Primary Examiner* — Wing Chan
*Assistant Examiner* — Joiya M Cloud
(74) *Attorney, Agent, or Firm* — John L. Rogitz

(57) ABSTRACT

A system and method for solving the weak membership problem in a system of nodes that might include redundancies. Each node is given the same random seed. Each node uses a link state protocol to determine the current system topography, and then an optimization such as simulated annealing is run on the topography at each node, independently of the other nodes, to determine the optimum weak membership for use thereof in subsequent system operations. Since each node starts with the same random seed, the nodes all arrive at the same solution without having to communicate a common solution between nodes.

18 Claims, 3 Drawing Sheets

PHYSICAL
SYSTEM

LOGICAL
SYSTEM

SYSTEM WITH
BROKEN LINK

NODE ARCHITECTURE

OVERALL LOGIC

OPTIMIZATION LOGIC

ALTERNATE LOGIC

SYSTEM AND METHOD FOR DETERMINING WEAK MEMBERSHIP IN SET OF COMPUTER NODES

BACKGROUND OF THE INVENTION

1. Field of the Invention

The present invention relates generally to computer node clusters, and more particularly to determining weak membership in a set of computer nodes.

2. Description of the Related Art

In cluster-based systems, such as cluster file systems, cluster-based block servers, cluster communication packages, cluster storage systems, fault-tolerant cluster-based packages, etc., it is important that a unified view of the cluster membership is presented to users and/or nodes in the cluster. For a cluster with no faults or absent nodes, this is simple—the entire cluster is presented as the membership. But cluster-based systems can experience link and node failures, in which case the cluster membership, and more particularly the membership in that subset of nodes in which every node is logically interconnected with every other node in the subset, is something less than the entire cluster. The failures and concomitant difficulty in knowing membership becomes more problematic with the advent of redundant storage access.

Knowing the maximum subset of nodes that are logically interconnected with each other requires solving what is referred to as the "weak membership" problem. The problem can be described as follows. Given a set A of interconnected nodes that can potentially be a part of a cluster membership, the maximum subset B must be found in which all the nodes in B can communicate with each other.

In previous cluster systems, a "boss" node is generally used to determine the subset membership, which then makes the membership known to all affected nodes. Unfortunately, in a "boss" scheme each node must have two code paths, one that is used when the node is the "boss" node and one that is used when the node is a subordinate node. Relatively much data must be transmitted through such a system, since the "boss" node must inform each subordinate node of the entire weak membership, node by node. Additionally, "boss" schemes require code to deal with exceptional circumstances, such as a re-elect mechanism to address the failure of the boss node and resolution mechanisms to account for multiple prospective boss nodes. These requirements complicate implementation and coding of "boss" node regimes and limit their scalability to smaller clusters, since a single "boss" node can encounter difficulty processing and distributing changes to all members of the cluster.

Even non-boss based methods that involve synchronized broadcast of membership changes can overload individual nodes with the processing of a flood of membership change messages. Furthermore, many clusters do not support the broadcast or multicast requirements imposed by such systems. Still further, asymmetric failures, that is, failures that occur when a node is connected to a given set of nodes but some nodes inside the set are not connected to all the nodes in the set, has generally not been accounted for in previous systems. This is because asymmetric failures are not likely in the context of clusters connected through a single network, but become more common in redundant networks, the possibility of which has not always been considered by prior methods.

With the above considerations in mind, the present invention critically recognizes the need to solve the weak membership problem in clustered systems in a way that is scalable, that accounts for redundant networks, and that does not require a cluster to support broadcasting or multicasting or to bear relatively high message traffic to support the solution. Accordingly, the present invention provides the solutions disclosed herein to one or more of the above considerations.

SUMMARY OF THE INVENTION

A general purpose computer is programmed according to the inventive steps herein. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The invention can be implemented by a computer system including at least two nodes, with each node including logic for determining a system topography, and determining an optimum membership based on the topography. This determination at each node is based on a seed that is the same for each node. In a preferred embodiment, more than two nodes are used, and each node uses the same seed as every other node in determining the optimum membership, such that the optimum membership arrived at by each node is the same membership arrived at by every other node.

Preferably, determining an optimum membership is undertaken using a randomized simulated annealing technique. Moreover, in one preferred implementation each node includes a link state module that determines the topology and an optimization module that determines the optimum membership. Further, the preferred link state module at each node communicates with at least one link state module at another node in the system and with a database of links and nodes. In the preferred implementation, elements in the database are periodically refreshed.

Each preferred node also includes an event manager that receives the optimum membership from the optimization module. The optimum membership is used by the event manager during system operations.

In a particularly preferred, non-limiting embodiment, the optimization module iteratively determines plural solutions. It also determines which solution is a most desirable solution, and then returns the most desirable solution if it is fully connected. Otherwise, the optimization module returns a next most desirable solution if the next most desirable solution is fully connected.

In another aspect, a computer program device includes a computer program storage device that is readable by a processor. A program is on the program storage device and includes instructions which can be executed by the processor for determining an optimum weak membership in a set of nodes in a system. The program includes means for receiving state changes in the system, and means for determining the optimum weak membership based at least in part on the state changes using a random number seed that is made available to at least two nodes in the system.

In another aspect, a method for providing, in a system of nodes, at at least first and second nodes with a membership that is identical for each first and second node without requiring the membership to be communicated between the nodes includes providing each node with a random seed. The random seed is the same at the first node as it is at the second node. The method also includes, at the first and second nodes, using the random seed to arrive at a membership in the system of nodes.

In yet another aspect, a method for establishing, at at least first and second nodes in a system of nodes, an optimization that is identical for each first and second node without requiring the optimization to be communicated between the nodes is disclosed. The method includes executing the optimization at the first node and the second node such that each node must arrive at the same optimization as the other node.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
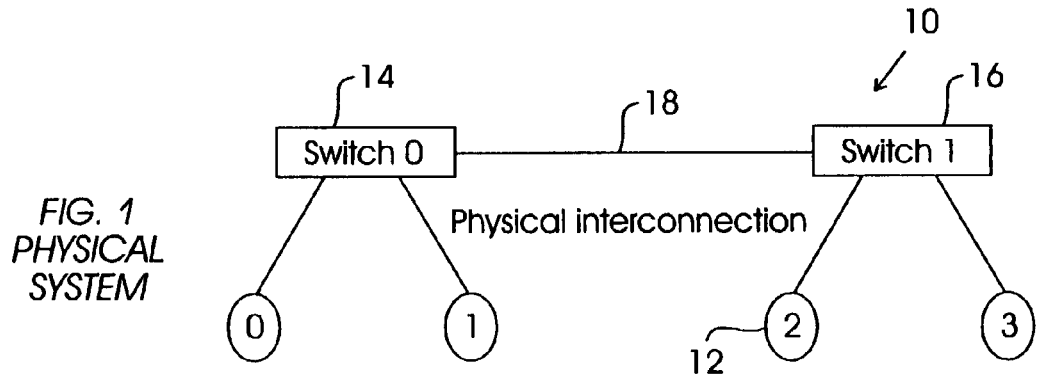
FIG. 1 is a schematic diagram showing a simplified version of the system of the present invention, showing the physical interconnections.
Figure 2:
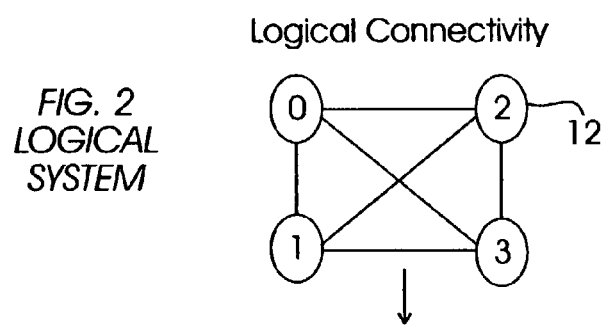
FIG. 2 is a schematic diagram of the system shown in FIG. 1, showing logical connections.

Referring initially to FIG. 1, a system is shown, generally designated 10, for determining a weak membership in a set of computer nodes 12. As shown, the nodes 12 labelled "0" and "1" are connected to a first switch 14, the nodes 12 labelled "2" and "3" are connected to a second switch 16, and the switches 14, 16 are connected together via a link 18 to produce a cluster of nodes, all of which consequently are logically connected to each other, as shown in FIG. 2. While the figures show four nodes 12 for clarity, it is to be understood that the principles advanced herein apply equally to clusters with more nodes, indeed, with hundreds if not thousands of nodes, potentially having redundant connections or nodes.

Figure 3:
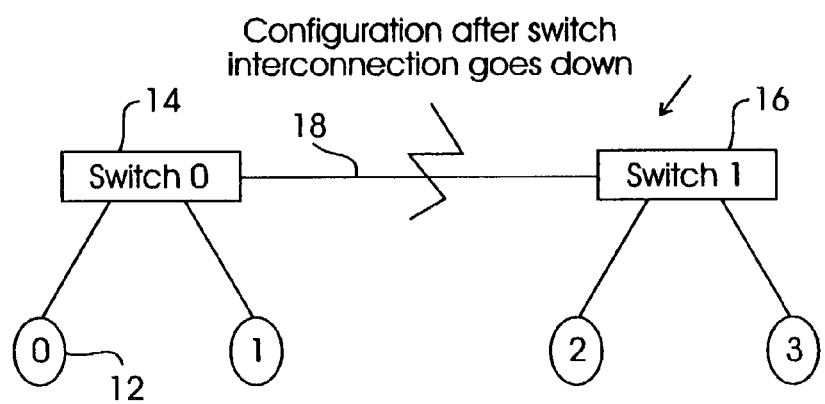
FIG. 3 is a schematic diagram of the system in the event of a broken link.

FIG. 3 schematically shows that if the link 18 is broken, the maximum membership is something other than all four nodes 12. This is because if the link 18 is broken, not all nodes 12 in the four node cluster shown communicate with all the other nodes, but only with the node that is connected to the same switch. When a link, switch, node, or other component of a cluster is lost, the present invention can be invoked to develop a maximum membership for the system 10 at each node 12, with each node 12 arriving at the same solution as the other nodes but independently of the solutions developed by the other nodes.

The system 10 can be a file system, database system, or other clustered system. In one intended embodiment, the processor or processors (computers) of the present invention may be personal computers made by International Business Machines Corporation (IBM) of Armonk, N.Y., or any computers, including computers sold under trademarks such as AS400, with accompanying IBM Network Stations.

The flow charts herein illustrate the structure of the logic embodied by each node 12 and executed by the processor of the node, as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the flow charts may be embodied in a computer program that is executed by a processor as a series of computer-executable instructions. These instructions may reside, for example, in a program storage device of the system 10. The program storage device may be RAM, or a magnetic or optical disk or diskette, DASD array, magnetic tape, electronic read-only memory, or other appropriate data storage device. In an illustrative embodiment of the invention, the computer-executable instructions may be lines of compiled $C^{++}$ compatible code.

Figure 4:
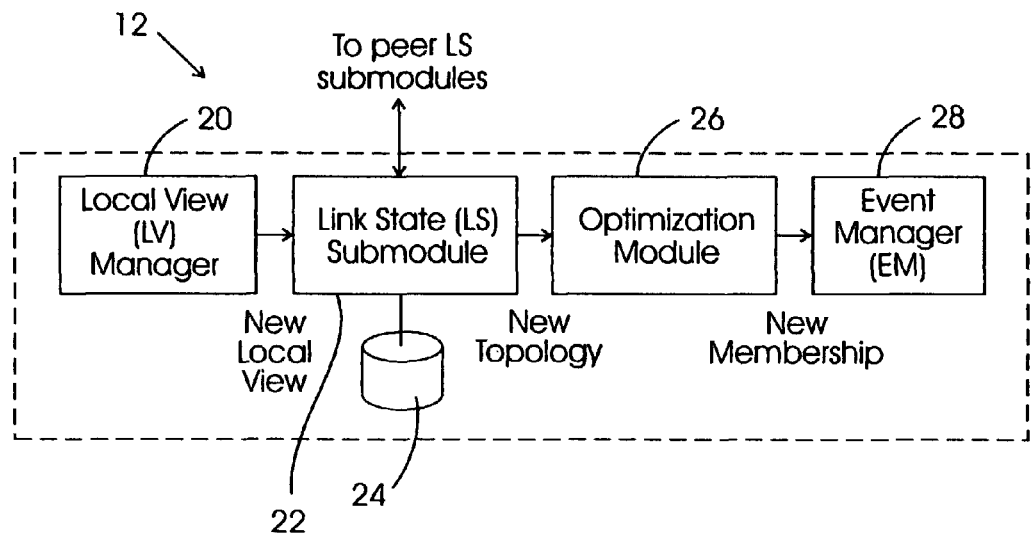
FIG. 4 is a block diagram of the architecture of a node.

Now referring to FIG. 4, the architecture of each of at least two, and preferably of all, the preferred nodes 12 can be seen. As shown, a local view (LV) manager 20 provides status of the node 12 to a link state (LS) submodule 22, also referred to herein as an LS module 22. In the preferred embodiment, the LS module 22 executes a link state protocol known in the art which is conventionally used by routers and described in "RFC-24328: OSPF Version 2", incorporated herein by reference. In accordance with link state protocol principles known in the art, the LS module 22 generates a topology of the active nodes in the system 10.

To support this, the LV manager 20 provides node 12 information and information regarding links to and from the local node 12 to the LS module 22, including connect and disconnect events, so that the LS module 22 knows the status of its local node 12. Moreover, peer LS modules (not shown) from other nodes 12 can also communicate similar status about their own nodes, which are remote from the LS module 22 shown in FIG. 4, and the LS module 22 can store the local and remote node information in a database 24.

The information from the LV manager 20 to the LS module 22 can be conveyed using link state packets (LSP) that include source node ID (the node that generated the packet), destination node ID (the ID of the node(s) to which the packet is sent), sequence number (the sequence number used by the source node and associated with the packet), age (time interval for refresh, discussed further below), flags (indicating whether the LSP was generated by a remote node or by the local node), and event, e.g., connect, disconnect.

It is to be appreciated that each node participating in the link state protocol generates a set of link state packets (LSP) describing the node's connections. Upon system initiation, LSPs from a node are grouped and sent through the network to each node to which the sending node is connected. Receiving nodes store the LSPs in their local databases 24, assuming the LSP contains new information. Also, each receiving node forwards copies of the LSP to each node to which it in turn is connected, except the originating node.

Each node 12 must be able to determine whether LSPs contain newer information than what is already contained in its local database 24. In one preferred embodiment, the sequence number is used for this purpose. An unsigned long integer is used to represent each sequence number. When comparing sequence numbers A and B, a node must account for "wrapped" sequence numbers. Specifically, if the maximum count that can be represented using an unsigned integer is N, then the following test can be used if desired to account for sequence number rollover: A is older than B if $|B-A|>N/2$, and otherwise A is newer than B.

To ensure that a newly booting or restarting node selects a sequence number that overrides that node's previous LSPs, a so-called "lollipop" sequence space can be used, in which the sequence number space is divided into two sets of numbers,

[−N/2, 0] and [0, N/2]. When a node boots, it starts using sequence numbers in the first set in increasing order, and when the number becomes positive, sequence numbers in the second set are used in increasing order, with the sequence number wrapping around the numbers in the second set only. In this "lollipop" space, sequence number A is older than sequence number B if A is negative and less than B, or if A is positive and less than B and B−A<N/4, or if A and B are positive, A is greater than B, and A−B>N/4. This ensures that nodes always start with the oldest sequence number possible. When a target node receives an LSP from a source node that has a sequence number which is older than the one contained in the database of the target node for the same link of the source node, the target node responds by sending the source node a copy of the LSP at the target node, so that the source node will be informed that it last used a later sequence number and will be able to update its sequence numbering accordingly. Thus, nodes that remain operational function as persistent storage for nodes that crash.

In the preferred implementation, "hello" messages, which are otherwise used to determine node failures, are not included. Also, when a cluster is split into groups of nodes that later become reconnected, nodes resynchronize by sending their complete LSP database to each other just after reconnection, so that each node can ascertain which of its LSP information is obsolete. If desired, only link IDs and LSP version numbers need be exchanged, to reduce the size of the messages.

As mentioned above, LSPs in the database 24 are aged and purged when they reach a predetermined refresh age, unless a refresh LSP has been sent from the source node. The periodic refreshes maintain the LSPs current. An LSP is refreshed only if the sequence number of the refresh LSP (whether for a connect or a disconnect) is later than that of the corresponding LSP in the database. In a preferred non-limiting implementation, the database 24 is implemented as a hash table where link-state information is maintained by hashing the node IDs of the two ends of the connection being represented.

Once the LS module 22 has developed a topology, the topology is sent to an optimization module 26. The optimization module 26 determines the optimum subset of nodes, i.e., the maximum number of nodes that are interconnected with each other, using the topology, and outputs the new membership of the optimum set to an event manager 28 for subsequent use in system operations. In the preferred embodiment, by "optimum" is meant a maximum membership of fully connected nodes that, e.g., satisfies the Clique problem or that is the closest approximation to the Clique solution as allowed by the parameters of the optimization technique being employed. The present invention contemplates that any appropriate randomized optimization routine can be used, including neural networks, genetic algorithms, and Tabu search. In the presently preferred embodiment, the optimization module 26 executes a simulated annealing technique as described in the present assignee's U.S. Pat. Nos. 4,495,559 and 5,745,735, incorporated herein by reference and further discussed below.

Figure 5:
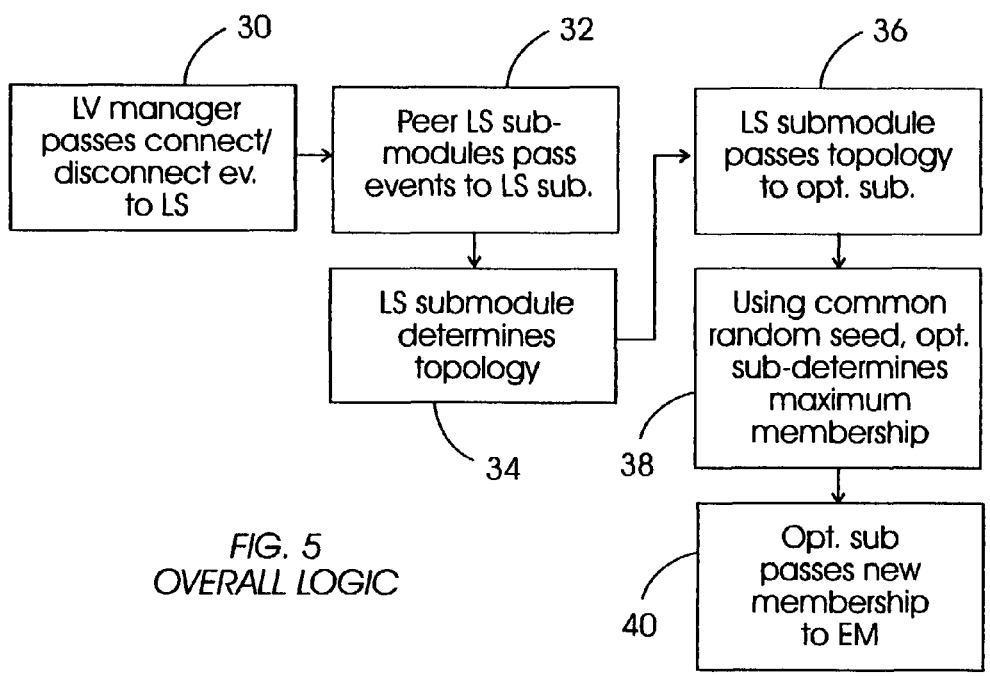
FIG. 5 is a flow chart showing the overall logic.

FIG. 5 illustrates the overall logic of the present invention. Commencing at block 30, the LV manager 20 passes connect and disconnect information to the LS module 22. Also, the LS module 22 can receive connect and disconnect information from peer LS modules at block 32 in the form of the above-described LSPs. Then, using this information the LS module 22 determines the topography of the system 10 at block 34. The topography is sent to the optimization module 26 at block 36 in the form of a graph of vertices (representing nodes) and edges (representing links). The optimization module 26, using a common random seed, determines a maximum membership at block 38 in accordance with optimization principles known in the art, preferably in accordance with simulated annealing principles. The new membership is passed to the event manager 28 at block 40 for use in subsequent system operations.

As mentioned above, a common random seed number is used at block 38. More specifically, each node 12 is given the same random seed as every other node with which to start the optimization process. With this feature, the optimum membership arrived at by each node 12 is the same membership arrived at by every other node 12, without having to transmit optimization solutions between nodes 12 and without requiring a "boss" node. More generally, an optimization is established at at least first and second nodes 12 that is identical for each first and second node 12 without requiring the optimization to be communicated between the nodes 12.

Figure 6:
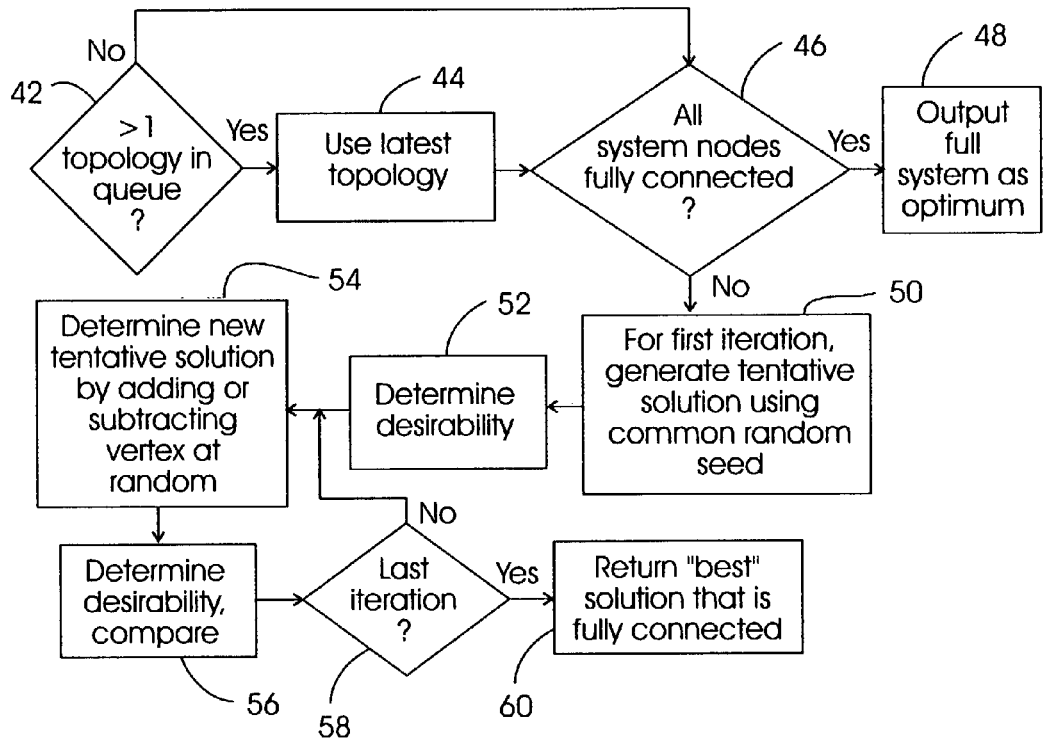
FIG. 6 is a flow chart showing a preferred, non-limiting optimization logic.

FIG. 6 shows details of the presently preferred logic of the optimization module 26. As stated above, the preferred, non-limiting embodiment uses simulated annealing, which is described in the above-referenced patents. To summarize, in simulated annealing, a function f(x) is optimized by initially selecting a Solution, e.g., $X_i$ to the function. The function $f(X_i)$ is evaluated and a new point in the domain, $X_i'$, is selected at random, generally by slightly modifying $X_i$ by adding (or subtracting) some locality to the search. The function $f(X_i')$ is evaluated. The new point is chosen as the new solution with probability of one if $f(X_i')>f(X_i)$; otherwise, the new point is chosen as the solution with probability $e^{-(f(X_i)-f(x_i'))/kT}$, where k and T are positive constants ("T" is colloquially referred to as "temperature"). New points are picked, slowly decreasing T until an acceptable solution is found. In one intended embodiment the algorithm stops when a predetermined minimum temperature is reached (or when the solution consists of all nodes in the topology).

In the preferred implementation, commencing at decision diamond 42, it is determined whether more than one topology is in the queue of the optimization module 26. If so, the latest topology is selected at block 44. From block 44 or from decision diamond 42 when the test there is negative, the logic moves to decision diamond 46, wherein it is determined whether all topology nodes are fully connected to each other. If they are, the logic ends at block 48, wherein the full topology is output as the optimum solution.

Otherwise, the logic proceeds to block 50, wherein for the first iteration, a tentative solution is randomly generated using the common random seed that is provided to all nodes 12. Thus, each node generates the same initial solution and hence will generate the same final solution as every other node.

At block 52, the solution is evaluated, i.e., its desirability is determined. Then, at block 54 a new solution is determined by adding or subtracting a vertex from the input graph at random to the solution generated at block 50. Again, this randomization will be the same for all nodes, since all nodes start with the same random number seed.

The desirability of the new solution is determined at block 56 and compared to the desirability of the "old" solution. The solution with the highest desirability in accordance with simulated annealing principles is maintained as the "old" solution. It is then determined whether the last iteration has been performed by determining, for instance, whether a predetermined minimum temperature has been reached. If so, the "best" solution, i.e., that solution among the solutions with all nodes fully interconnected that has the highest desirability, is output at state 60. Otherwise, the logic iterates back to block 54 to determine a new solution.

Figure 7:
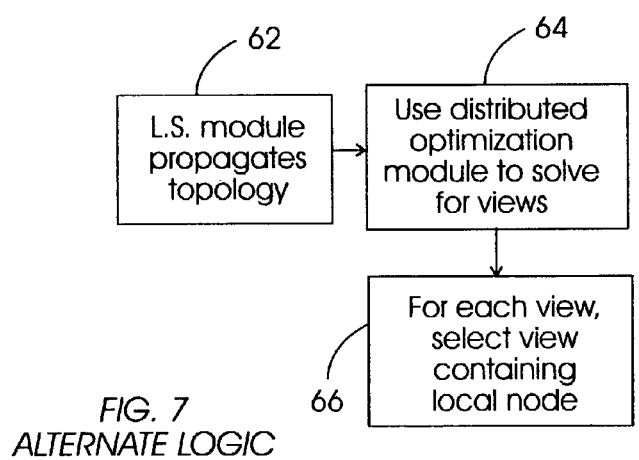
FIG. 7 is a flow chart showing alternate logic.

FIG. 7 shows alternate logic that does not require the provision of a common random seed. Commencing at block 62, the link state module propagates the topology as described above. Then, at block 64 a distributed version of the optimization module, i.e., one version per view, solves the above-described problem for each respective view. At block 66, for each view, the view containing the local node is selected.

With more specificity, the step at block 64 could be executed as follows. Each node maintains a population of N+X individuals (solution candidates), where N is the maximum number of nodes in the cluster and X is the population size that would work well for the equivalent non-distributed solution. Every instance of each of the N individuals (there is one instance per node in the cluster) is owned by one node so, for example, node 1 owns all instances of individual 1 on nodes 1 to N and node 2 owns all instances of individual 2 on nodes 1 to N etc.

The N individuals are updated using a protocol such as the link state protocol, so for example, node 1 could choose to change the value of individual 1 and eventually all nodes would be informed of the new value for individual 1.

When a node detects a topology change, it randomizes the X individuals and executes the optimization module, which must incorporate all N+X individuals in the population but can only replace the X individuals. This can function as follows. First, two parents from the X+N individuals are randomly selected. The parents are "mated" and the offspring "mutated" to establish a new individual to replace the least fit X individual. When the module creates a new most fit individual which is not represented amongst the N individuals, it replaces the one of the N that it owns with the new individual and the new candidate solution is propagated to all of the other nodes.

For example, if node 2 discovered a new most fit individual, it would replace individual 2 from the N with that individual and the protocol would propagate the value of that individual to all number 2 individuals amongst the cluster so it would take part in the optimizations on all of the other nodes as well. The optimization executes until the solution has remained constant for a number of iterations or a period of time. One the optimization terminates, the most fit individual from the N+X is selected as the solution. If implemented correctly, the solution is guaranteed to converge across all of the nodes because the best solution discovered anywhere is eventually propagated to all of the nodes so they will all use it.

While the particular SYSTEM AND METHOD FOR DETERMINING WEAK MEMBERSHIP IN SET OF COMPUTER NODES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer system, comprising:
   plural computer nodes, each node:
   determining a system topography;
   determining an optimum nodal membership based on the topography, the determining of an optimum nodal membership at each of the plural nodes converging with the determining of an optimum nodal membership on each of the other nodes of the plural nodes in the computer system with each of the plural nodes arriving at the same optimum nodal membership without having to transmit optimization solutions to the other nodes of the plural nodes, the optimum nodal membership that is arrived at by the plural nodes without having to transmit optimization solutions to the other nodes being used by all nodes in the system.

2. The system of claim 1, comprising more than two nodes, the determining of an optimum nodal membership being based on a seed, the seed being the same for each node such that each node uses the same seed as every other node in determining the optimum membership, such that the optimum membership arrived at by each node is the same membership arrived at by every other node.

3. The system of claim 1, wherein determining an optimum membership is undertaken using a randomized simulated annealing technique.

4. The system of claim 1, wherein each node includes a link state module undertaking the determining a topology and an optimization module undertaking the determining an optimum membership, the link state module sending the topology to the optimization module.

5. The system of claim 4, wherein the link state module at each node communicates with at least one link state module at another node in the system.

6. The system of claim 4, wherein the link state module communicates with a database of links and nodes.

7. The system of claim 6, wherein elements in the database are periodically refreshed.

8. The system of claim 4, wherein each node includes an event manager receiving the optimum membership from the optimization module, the optimum membership being used by the event manager during system operations.

9. The system of claim 4, the optimization module further iteratively determining plural solutions;
   determining which solution is a most desirable solution;
   returning the most desirable solution responsive to a determination that the most desirable solution is fully connected; otherwise
   returning a next most desirable solution responsive to a determination that the next most desirable solution is fully connected.

10. A method for providing plural nodes in a system of nodes with a membership that is identical for each node, comprising:
    providing topology information;
    providing a respective version of a node membership optimization module to each of plural views, wherein each version of the node membership optimization module determines a node membership and wherein for each view, a view containing a respective local node is selected, the nodes subsequently using the node membership.

11. The method of claim 10, wherein each node maintains a population of N+X individuals, where N is a maximum number of nodes in the cluster and X is a population size related to a non-distributed solution, wherein every instance of each of N individuals, one instance per node, being owned by one node such that a node "1" in the system owns all instances of individual "1" on nodes 1 to N of the system and a node "2" in the system owns all instances of an individual 2 on nodes 1 to N of the system.

12. The system of claim 11, wherein the N individuals are updated using a protocol such that responsive to the node 1 choosing to change a value of the individual 1, all nodes are informed of the value for individual 1.

13. The system of claim 12, wherein responsive to a node detecting a topology change, the node detecting the topology change randomizes X individuals and executes the node optimization module.

14. The system of claim 13, wherein the node optimization module of the node detecting the topology change incorporates all N+X individuals in the population but only replaces at most the X individuals.

15. The system of claim 14, wherein the node optimization module of the node detecting the topology change randomly selects two parents from X+N individuals are randomly selected, offspring of the parents being "mutated" to establish a new individual to replace a least fit of the X individuals.

16. The system of claim 15, wherein the node optimization module of the node detecting the topology change, responsive to creating a new most fit individual which is not represented amongst the N individuals, replaces the one of the N individuals that it owns with the new most fit individual and propagates a resultant new solution to all of the other nodes in the system.

17. The system of claim 16, wherein node optimization modules execute until a propagated solution has remained constant for a number of iterations or a period of time.

18. The system of claim 17, wherein responsive to optimization terminating, the most fit individual from the N+X is selected as a system-wide solution.

* * * * *